(12) United States Patent
Lesche

(10) Patent No.: US 7,644,569 B2
(45) Date of Patent: Jan. 12, 2010

(54) WELDED HAND RAKE/FORK TOOL WITH WELDED TINE AND METHOD

(76) Inventor: Peter W. Lesche, 1220 Grissel Dr., Millville, NJ (US) 08332

( * ) Notice: Subject to any disclaimer, the term of this patent is extended or adjusted under 35 U.S.C. 154(b) by 0 days.

(21) Appl. No.: 12/321,930

(22) Filed: Jan. 27, 2009

(65) Prior Publication Data
US 2009/0211217 A1    Aug. 27, 2009

Related U.S. Application Data

(63) Continuation-in-part of application No. 12/072,525, filed on Feb. 27, 2008, now abandoned.

(60) Provisional application No. 60/997,287, filed on Oct. 2, 2007.

(51) Int. Cl.
*A01D 7/00* (2006.01)
(52) U.S. Cl. ................................ 56/400.21; 56/400
(58) Field of Classification Search ............ 56/400, 56/400.21, 400.16, 400.17, 400.2
See application file for complete search history.

(56) References Cited

U.S. PATENT DOCUMENTS 2,241,878 A * 5/1941 Firstenberger et al. ........ 56/400
2,882,588 A * 4/1959 Rieppel ................ 29/890.042
2,947,370 A * 8/1960 Nelson ........................ 172/375

FOREIGN PATENT DOCUMENTS

FR    2784286 A1 *  4/2000

* cited by examiner

*Primary Examiner*—Alicia M Torres
(74) *Attorney, Agent, or Firm*—Stuart M. Goldstein

(57) ABSTRACT

A rake, pitchfork, or similar forked hand tool or tool head for mechanized machinery has welded tines. The tines each have a lower section located on the backbone of the tool head and a working section extending outwardly from the backbone. Each tine also has two lateral surfaces, two vertical surfaces and a transversely extending back edge surface therebetween. In one embodiment, welds extend the full length of one of the lateral surfaces, the full length of a vertical surface, the transverse length of the back edge surface and down the second vertical surface to the junction between the bottom of the vertical surface and the second lateral surface. Welds can also extend partially along the length of the second lateral surface for a distance not to exceed three quarters of its length. These tines have elongated fracture lines. The resulting tool is far less prone to breakage.

8 Claims, 6 Drawing Sheets

WELDED HAND RAKE/FORK TOOL WITH WELDED TINE AND METHOD

This application claims the benefit of provisional application Ser. No. 60/997,287, filed on Oct. 2, 2007, and is a continuation-in-part of non-provisional application Ser. No. 12/072,525 filed Feb. 27, 2008 now abandoned.

BACKGROUND OF THE INVENTION

The invention relates to the field of rakes, pitchforks, and similar forked hand tools, as well as attachments for mechanized machinery used for ground sifting, bucket digging, cultivating, and dethatching. All such tools and machinery are used in the handling of loose or compacted materials, especially in the performance of heavy work done by gardeners, landscapers, nurserymen, hardscapers, contractors, road builders, farmers and like workers. The tines on the types of tools and mechanized machinery attachments to which the invention relates are attached at one end to the backbones of these tools and machinery and are free at their other ends. It has been found that under hard usage, the tines of these types of tools and machinery attachments, welded to the backbones using known welding methods, or if they are improperly welded, will either totally separate from the backbone or fracture/break off, leaving a stub still attached to the backbone. An annealing process occurs when attempts are made to reweld the damaged tine to the backbone. This results in further weakening of the backbone and the surrounding tines. Attempts at reheat treating the effected areas or the entire tool have proven to be cost prohibitive and fruitless in strengthening the tine to backbone connection.

SUMMARY OF THE INVENTION

It is an object of the present invention to overcome the disadvantages and limitations of prior welded forked tools.

It is an object of the present invention to provide a welded forked tool constructed with tines which are welded to the tool backbone so as to prevent and virtually eliminate tine breakage from the tool.

It is another object of the present invention to provide a welded forked tool constructed with tines which are more durable than those tines on existing tools.

It is a further object of the present invention to provide a welded forked tool which will retain all its welded tines for the full life of the tool.

It is still another object of the present invention to provide a welded forked tool constructed with tines which eliminates the continual frustration and costs associated with replacement of inferior tools.

It is another object of the present invention to provide a method of welding tines of forked tools to the backbone of the tools so as to prevent and virtually eliminate tine breakage from the tools.

It is a further object of the present invention to provide a method of welding tines of forked tools to the backbone of the tools so as to ensure that a forked tool will retain all its tines for the full life of the tool.

It is still another object of the present invention to provide a method of welding tines of forked tools to the backbone of the tools so as to eliminate the continual frustration and costs associated with replacement of inferior tools.

These and other objectives are accomplished by the present invention, a smoothing/sifting rake, fork, pitchfork, or similar forked hand tool or attachment or tool head for mechanized machinery with specially welded tines. The tines each have a lower section located on the backbone member of the tool head and a working section extending outwardly from the backbone. Each tine also has two longitudinally extending lateral surfaces, two vertical surfaces, and a transversely extending back edge surface therebetween. In one embodiment, welds extend the full longitudinal length of one of the lateral surfaces, the full length of a vertical surface, the transverse length of the back edge and down the second vertical surface to the junction between the bottom of the vertical surface and the second lateral surface. Welds can also extend partially along the longitudinal length of the second lateral surface for a distance not to exceed three quarters of its length. For heavy duty applications, welds are optionally applied to the back edge surface. The tool and machinery attachments with tines welded in this manner, in accordance with the unique method of welding, provides for increased strength of the tine to backbone juncture, thereby eliminating total separation of the tine from the backbone and preventing premature fracture of the tine along the leading edge of the backbone. The tines have elongated fracture lines and the resulting tool or attachment is much stronger and far less prone to breakage.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
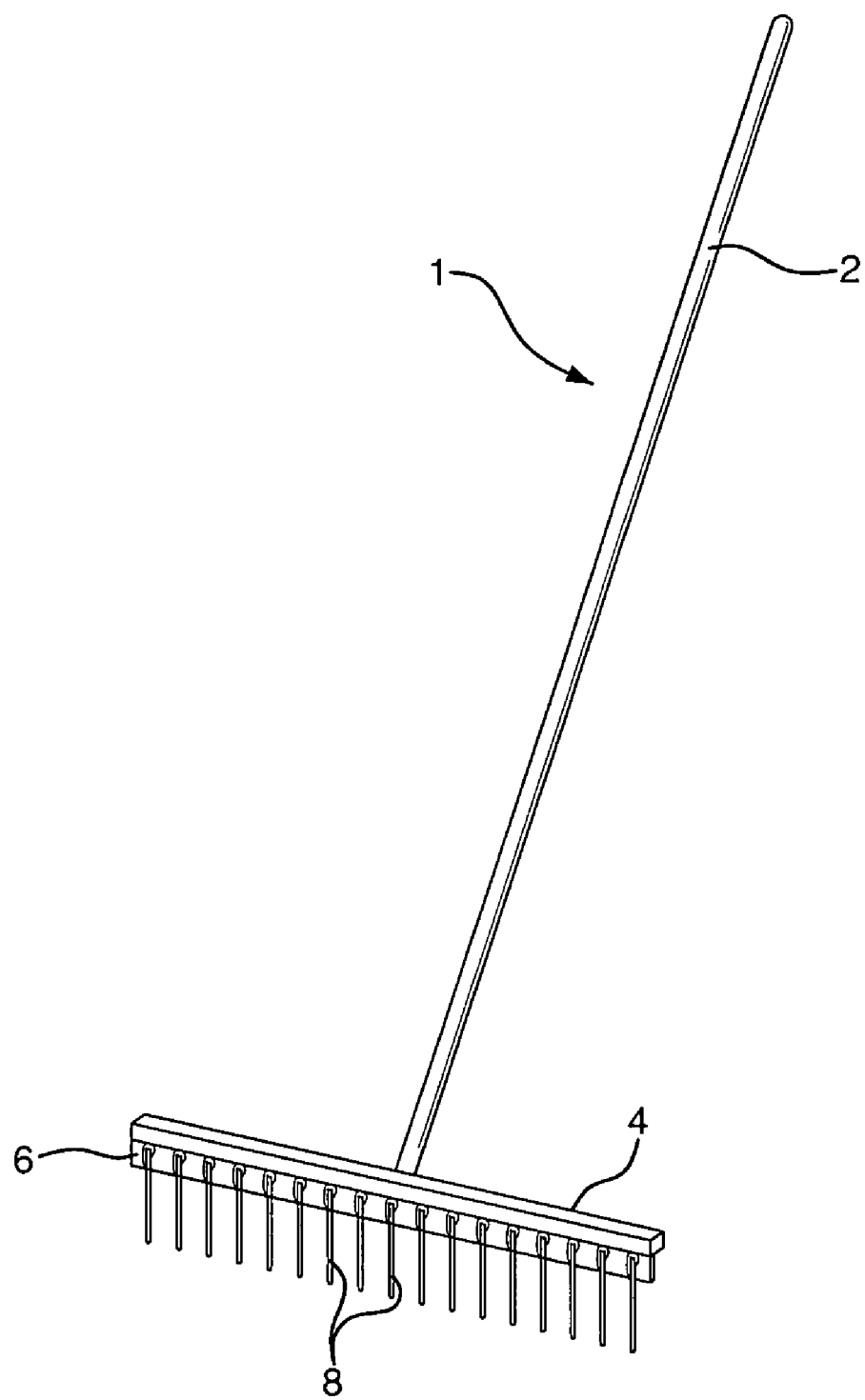
FIG. 1 is an isometric view of an exemplar tined tool, welded in accordance with the present invention.

Rake 1, in FIG. 1, shows an exemplar tined tool employing the tine welding technique of the present invention. Rake 1 has handle 2 secured to tool head 4 comprising backbone member 6 with tines 8 welded thereto. Backbone member 6 can be separately attached by bolts or equivalent fastening means, or it can be integral to the handle.

Figure 2:
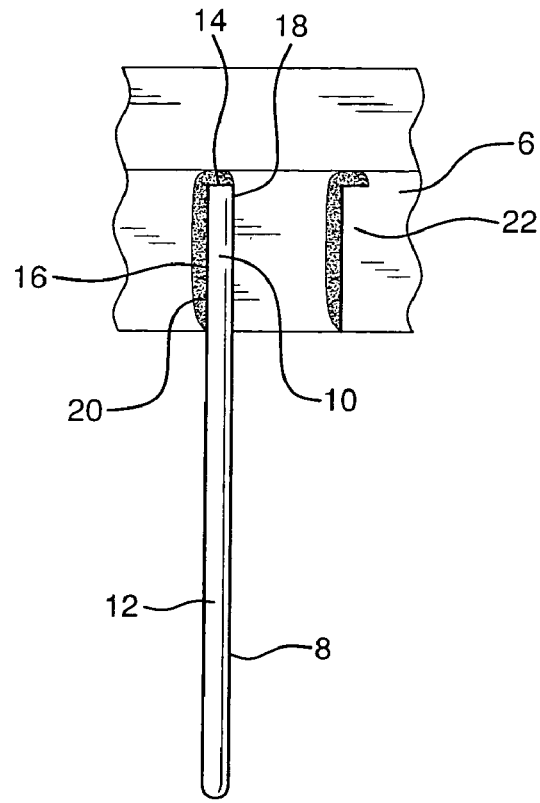
FIG. 2 is a top view showing a prior tine weld configuration.
Figure 3:
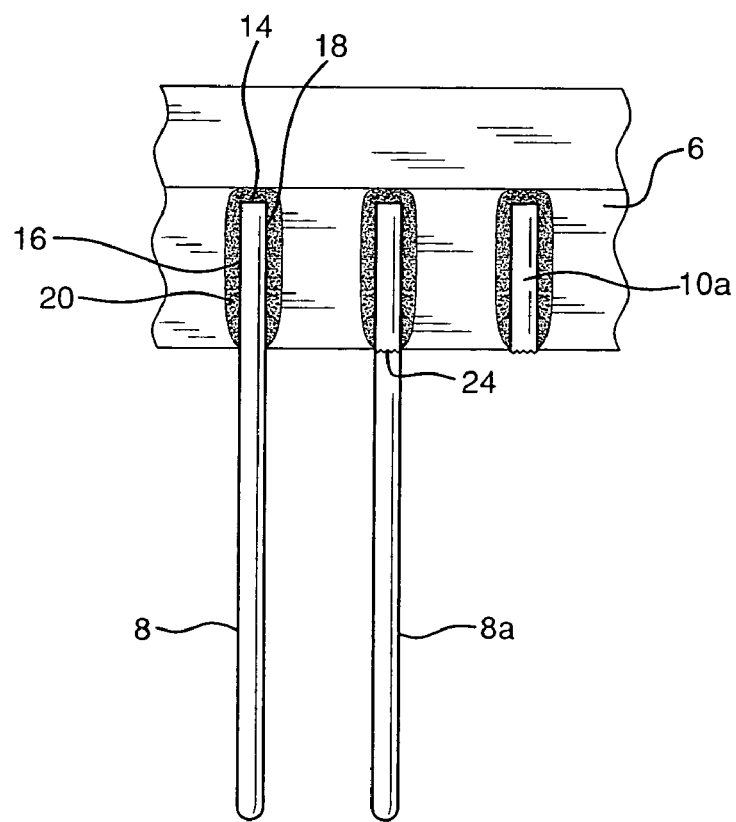
FIG. 3 is a top view showing an alternate prior tine weld configuration.

FIGS. 2 and 3 show prior art tine to backbone welding techniques. Tine 8 in these FIGs., and in all the FIGs. discussed herein, comprises a main body with lower section 10 welded to backbone member 6 and working section 12, outwardly extending from the backbone member. Lower section 10 has back edge surface 14, with a relatively short transverse length, and first and second lateral surfaces 16 and 18, each with longitudinally extending lengths forming part of the overall longitudinal length of each tine 8.

With specific reference to FIG. 2, weld material 20 is laid on a line on backbone member 6, along the full longitudinal length of one lateral surface 16, and then only along back edge surface 14 of tine 8. No weld material extends past back edge surface 14; and therefore no weld is on the vertical surface leading from this back edge surface to second lateral surface 18 or on the second lateral surface. In this common welding configuration, tine 8 is not sufficiently supported and likely will be caused to simply become separated from backbone member 6 (at 22), due to impact and/or twisting. This routinely occurs when rake 1 is put to heavy usage or when the tine itself strikes a hard object such as a rock.

With specific reference to FIG. 3, weld material 20 is laid on backbone member 6, along back edge surface 14 and the full longitudinal lengths of both lateral surfaces 16 and 18 of tine 8. This creates a short transverse fracture line 24 and, upon heavy usage of tool 1, this commonly used welding configuration will cause tine 8a to break off at fracture line 24, leaving only lower section 10a of the tine remaining on backbone member 6. Fracture line 24, being as short as it could be, results in the tine having a greater tendency to break at the fracture line.

Figure 4:
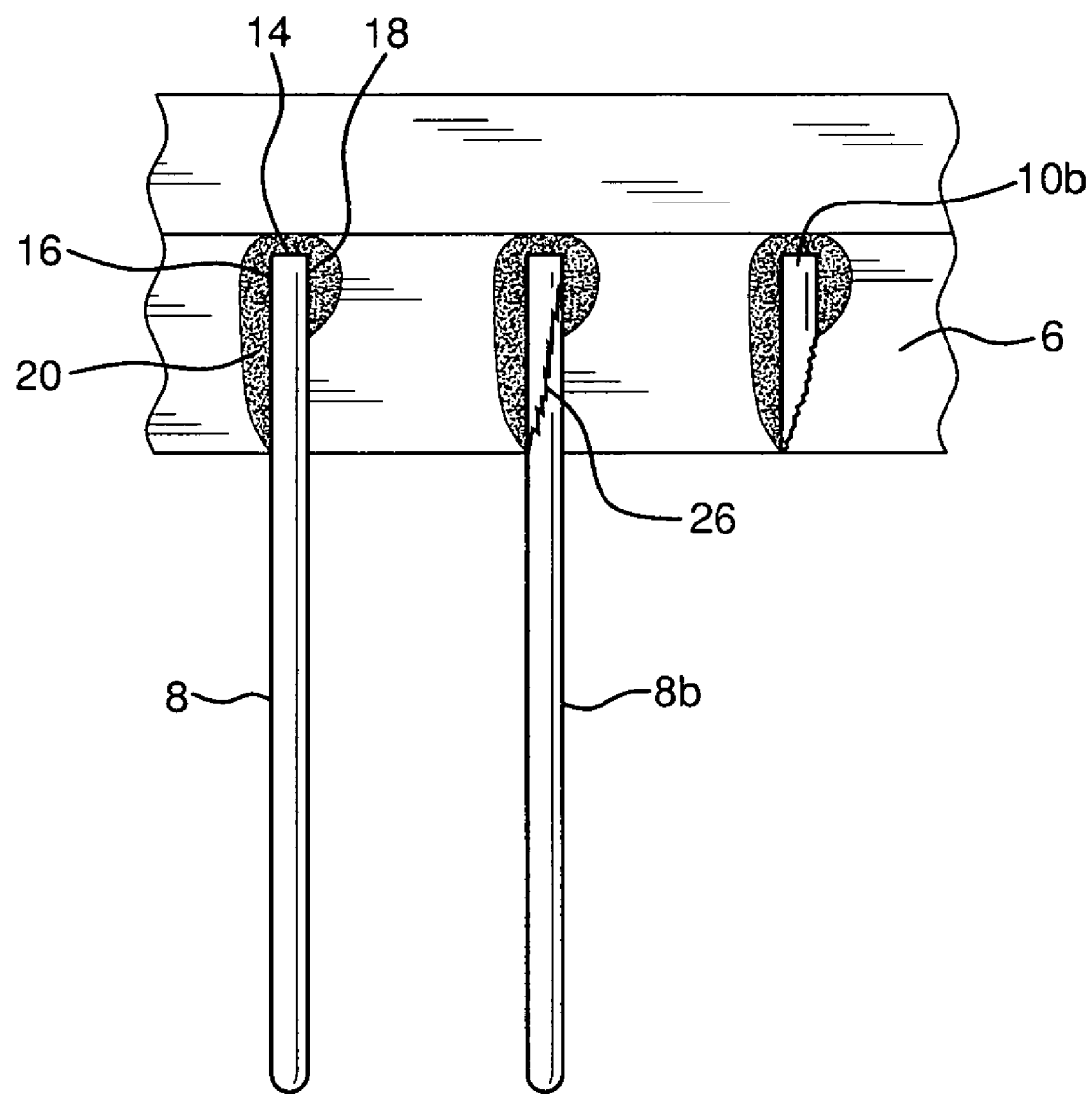
FIG. 4 is a top view of tines welded in accordance with the present invention.

The welding configuration of the present invention increases the length of the fracture lines of tines and thus greatly increases the strength of the tines. FIG. 4 shows tine 8 welded in accordance with the invention. Weld material 20 is laid on a line on backbone member 6 along the full longitudinal length of one lateral surface 16, along the transverse length of back edge surface 14, and only partially along the longitudinal length of lateral surface 18. It has been found that weld material 20 can be laid halfway or substantially halfway along the longitudinal length of lateral surface 18, for optimizing the welded tine to backbone connection and thus increasing the length of the tine's fracture line and resistance to complete separation. As seen in FIG. 4, it would be more difficult for tine 8b to fail, since it has an elongated fracture line 26. If tine 8 was to fail, it would do so along this substantially elongated diagonal fracture line 26, leaving less of lower section 10b attached to backbone member 6.

Figure 5:
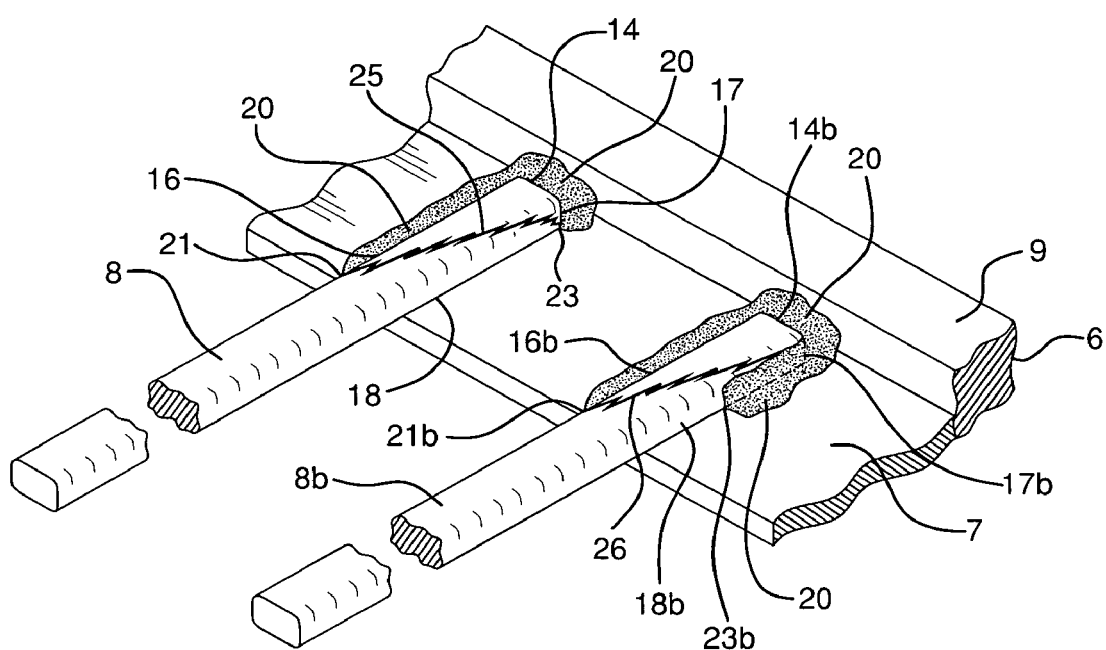
FIG. 5 is an isometric view of the tines welded in accordance with the present invention in additional detail.

FIG. 5 is a representation in further detail, of the weld configuration of the present invention first depicted in FIG. 4. Tines 8 and 8b are positioned so that their respective lateral surfaces are on mounting section 7 of backbone member 6, adjacent to but not in contact with upper backbone section 9. There is a small clearance between back edge surface 14 of the tine and upper backbone section 9—for the placement of weld material 20.

With regard to tine 8, a line of weld material 20 is laid on mounting section 7 and along the full longitudinal length of lateral surface 16, along vertical surface 15 up to upper backbone section 9, along the transverse length of back edge surface 14, and then along vertical surface 17 and the upper backbone section. This completes the uninterrupted line of weld from point 21 near the front of lateral surface 16, to location point 23, i.e. substantially at the bottom of vertical surface 17, immediately adjacent to mounting section 7 of backbone member 6. Stated differently, weld 20 terminates on second lateral surface 18, substantially at the junction between the bottom of vertical surface 17 and the second lateral surface. Thus, the terminus of weld 20 will overlay a very small portion of second lateral surface 18 and it is this terminus which constitutes location point 23, as seen in FIG. 5. This weld configuration creates extended diagonal fracture line 25, which materially lessens the potential for breakage of the tines which are welded to backbone member 6.

Figure 6:
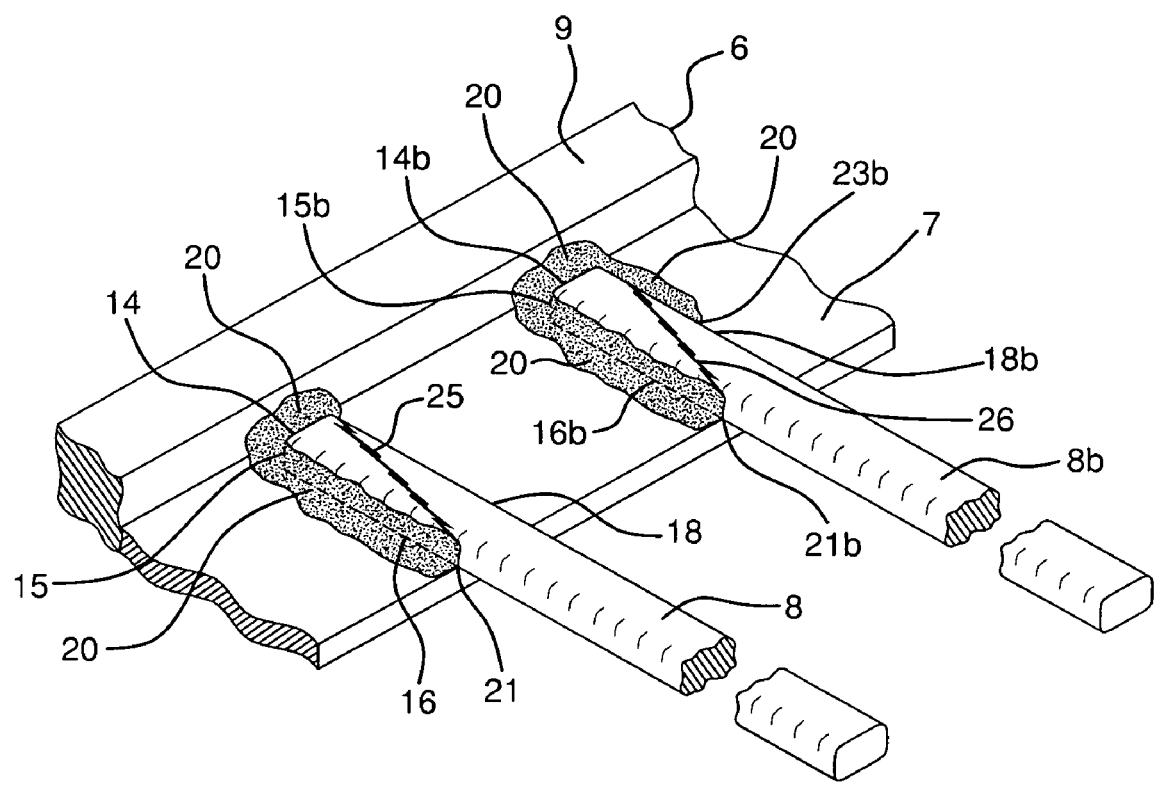
FIG. 6 is an isometric view of the other side of the tines shown in FIG. 5.

As shown with regard to tine 8b in FIGS. 5 and 6, a line of weld material 20 begins at location point 21b and also is laid on mounting section 7 and along the full longitudinal length of one lateral surface 16b, along vertical surface 15b and upper backbone section 9, along the transverse length of back edge surface 14b, along vertical surface 17b, and then along lateral surface 18b at a distance of no more than three quarters the longitudinal length of tine 8b, to location point 23b. This weld configuration also creates an extended diagonal fracture line 26. The length of this fracture line will vary, but will still be elongated diagonally across the tine.

Thus the weld configuration of the present invention prevents tines from coming loose and falling off or breaking away from the tool heads, as compared to tines which are only welded on two sides (FIG. 2) or where welds are laid completely around the tines (FIG. 3). The invention extends or elongates the stress or fracture line across the tines, extending from the end of the front edge weld, across the tine to the opposite side, terminating at the opposite weld, in a diagonal line, as at 25 and 26, instead of transversely or straight across, as at 24. This greatly increases the strength of the tine, resulting in a tine that is far stronger and secure in its attachment.

Figure 7:
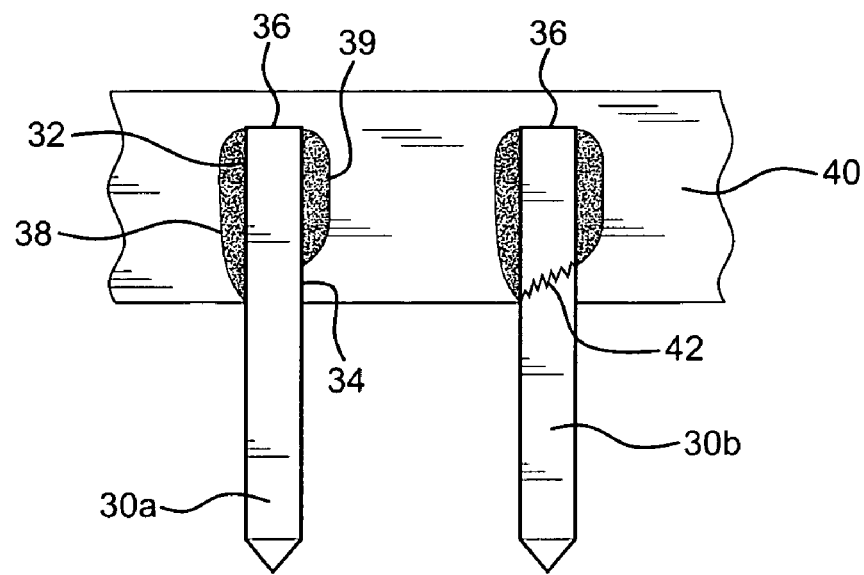
FIG. 7 is a top view of the tines welded for heavy duty application, in accordance with the present invention.
Figure 8:
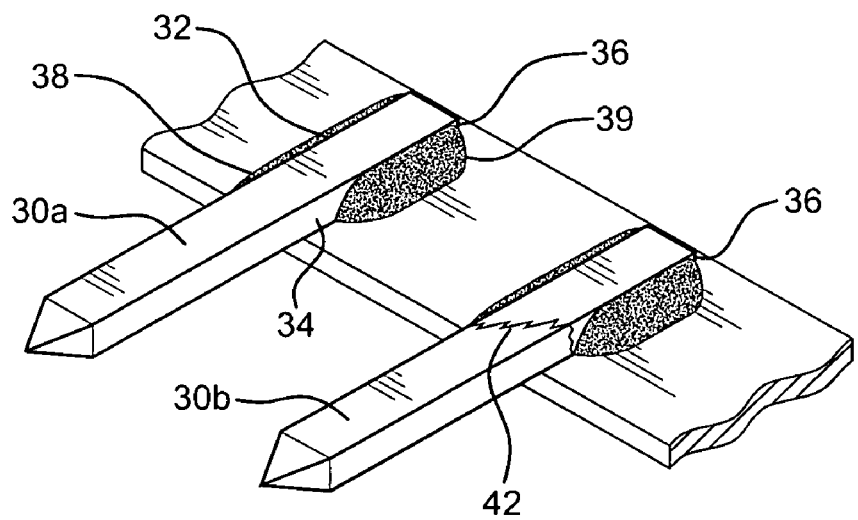
FIG. 8 is an isometric view of tines welded for heavy duty application in accordance with the present invention.

FIGS. 7 and 8 show the tine to backbone configuration employed for heavy duty application, such as would be employed on attachments or tool heads of mechanized machinery used for ground sifting, digging, and cultivating. Larger, more substantive tines 30a and 30b are welded onto supporting backbone member 40 of an attachment or tool head. In this embodiment, weld 38 is laid along the full longitudinal length of one lateral surface 32 and weld 39 is laid partially along the second lateral surface 34. Given the size of the tines and the much greater weld to backbone surface area, no weld is necessary along back edge surface 36. Using this weld configuration, tines 30a and 30b, once again, will be far less prone to fail, as a result of substantially elongated fracture line 42.

The tines of the present invention can also be welded by a robot employing skip welding all around the head, to minimize warpage and alloy burnout.

It is contemplated that not each tine need be fully welded down the same side. The completely welded side can be on alternating tines or randomly located on the tines.

After all tines are welded into place, it is contemplated that the completed assembly will be heat treated to provide maximum strength and durability. The heat treatment clamps the hot assembly securely, thus eliminating the warpage associated with tine welding and furnace heating.

Welded fork tines secured by the weld configurations of the present invention have been tested in rotary parts cleaning tumblers and compared to welded fork tines secured by known techniques similarly tested. Such tumblers are typically cylindrical in shape, eight feet long and four feet in diameter. Flights approximately four inches in length protrude into the interior of the tumbler to enhance the cleaning of tool heads placed in the tumbler. Tool heads are placed in the tumbler, which rotates at a speed of about three revolutions per minute or 180 revolutions per hour. A normal load of 18" long rake heads is approximately 80 units per four hour run time. The tines on the heads of rakes and similar tools welded as per the present invention experienced breakage in a ratio of 1 in 1000; that is 1 tine on one head out of one thousand heads failed. Tines on tool heads welded in accordance with commonly known practices, as exemplified by the tool shown in FIG. 3, fractured on the order of 4-10 tines for every 80 heads tumbled. Tines on heads welded as shown in FIG. 2 lost tines at approximately the same rate. Testing confirms that the longer the fracture line, the less chance of tine failure. The weld configuration of the present invention accomplishes this objective.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A hand tool comprising:
   a handle;
   a tool head connected to the handle;
   a plurality of tine members, each tine member having a lower section attached to the tool head and a working section extending outwardly from the tool head, the lower section of each tine member comprising first and second lateral surfaces with longitudinal lengths, a back edge surface with a transverse length extending between the lateral surfaces, and first and second vertical surfaces, the first vertical surface extending between the first lateral surface and the back edge surface, and the second vertical surface extending between the back edge surface and the second lateral surface; and
   means to permanently secure the tines to the tool head, said means comprising a continuous line of weld located between the lower section of each tine member and the tool head, the line of weld extending continuously along the full longitudinal length of the first lateral surface, along the full length of the first vertical surface, along the full transverse length of the back edge surface, along the full length of the second vertical surface, and partially over a section of the second lateral surface, said section ranging from substantially halfway not to exceed a distance of three quarters of the longitudinal length of the second lateral surface, whereby the means to permanently secure the tines to the tool head establishes an elongated, diagonal fracture line across each tine.

2. The hand tool as in claim 1 wherein the line of weld terminates on the second lateral surface, substantially at the junction between the bottom of the second vertical surface and the second lateral surface.

3. A tool head comprising:
   a supporting backbone member;
   a plurality of tine members, each tine member having a lower section attached to the backbone member and a working section extending outwardly from the backbone member, the lower section of each tine member comprising first and second lateral surfaces with longitudinal lengths, a back edge surface with a transverse length extending between the lateral surfaces, and first and second vertical surfaces, the first vertical surface extending between the first lateral surface and the back edge surface, and the second vertical surface extending between the back edge surface and the second lateral surface; and
   means to permanently secure the tines to the backbone member, said means comprising welds located between the lateral and vertical surfaces and the backbone member, the welds extending the full longitudinal length of the first lateral surface, the full lengths of the first and second vertical surfaces, and partially over a section of the second lateral surface, said section ranging from substantially halfway not to exceed a distance of three quarters of the longitudinal length of the second lateral surface, whereby the means to permanently secure the tines to the backbone member establishes an elongated, diagonal fracture line across each tine.

4. The tool head as in claim 3 wherein the welds located along the second vertical surface terminate on the second lateral surface, substantially at the junction between the second vertical surface and the second lateral surface.

5. The tool head as in claim 3 wherein the welds are located between the back edge surface and the backbone member, the weld extending the full transverse length of the back edge surface.

6. The tool head as in claim 3 wherein the welds comprise a continuous line of weld.

7. The method of permanently securing tine members to a hand tool, the method comprising the steps of:
   providing a tool head member;
   providing a plurality of tine members, each tine member having a lower section and a working section, the lower section of each tine member comprising first and second lateral surfaces with longitudinal lengths, a back edge surface with a transverse length extending between the lateral surfaces, and first and second vertical surfaces, the first vertical surface extending between the first lateral surface and the back edge surface, and the second vertical surface extending between the back edge surface and the second lateral surface;
   positioning each tine member on the tool head such that the lower section of each tine member is located on the tool head with its lateral surfaces in direct contact with the tool head and such that the working section of each tine member extends outwardly from the tool head;
   applying a line of weld along the full longitudinal length of the first lateral surface of each tine member where said lateral surfaces are in direct contact with the tool head;
   applying a line of weld along the full length of the first vertical surface;
   applying a line of weld along the full transverse length of the back edge surface of each tine;
   applying a line of weld along the full length of the second vertical surface and onto the second lateral surface of each tine member where said lateral surfaces are in direct contact with the tool head, the line of weld ranging from substantially halfway not to exceed a distance of three quarters of the longitudinal length of the second lateral surface; and
   establishing an elongated, diagonal fracture line across each of the tine members.

8. The method as in claim 7 comprising the additional step of terminating the line of weld along the second vertical surface on the second lateral surface, substantially at the junction between the bottom of said surface and the second lateral surface.

\* \* \* \* \*